(12) United States Patent
Mihalos et al.

(10) Patent No.: US 7,582,321 B2
(45) Date of Patent: Sep. 1, 2009

(54) APPARATUS AND METHOD FOR PRODUCING SANDWICH COOKIE HAVING DISSIMILARLY-SIZED BASE CAKES

(75) Inventors: Mihaelos N. Mihalos, Palisades Park, NJ (US); Theodore N. Janulis, Randolph, NJ (US); Chris E. Robinson, Sparta, NJ (US); Carol Wines, Longmount, CO (US)

(73) Assignee: Kraft Foods Holdings, Inc., Northfield, IL (US)

( * ) Notice: Subject to any disclaimer, the term of this patent is extended or adjusted under 35 U.S.C. 154(b) by 699 days.

(21) Appl. No.: 10/931,380

(22) Filed: Sep. 1, 2004

(65) Prior Publication Data

US 2006/0045939 A1 Mar. 2, 2006

(51) Int. Cl.
*A21D 13/00* (2006.01)
(52) U.S. Cl. .................... 426/275; 426/502; 426/572
(58) Field of Classification Search .............. 426/275, 426/293, 497, 499, 502, 572; 99/428, 450, 99/50.4; 249/82; 74/588
See application file for complete search history.

(56) References Cited

U.S. PATENT DOCUMENTS

| D23,574 | S | | 8/1894 | Ward |
|---|---|---|---|---|
| D28,455 | S | | 4/1898 | Baker |
| 1,802,306 | A | | 4/1931 | Baker |
| 1,869,464 | A | | 6/1932 | Clark |
| 2,691,337 | A | | 10/1954 | Forrest |
| 2,993,453 | A | | 7/1961 | Fay |
| 3,141,400 | A | * | 7/1964 | Powers ................ 249/82 |
| 3,290,859 | A | | 12/1966 | Talbot |
| 3,416,466 | A | * | 12/1968 | Weidenmiller ........... 425/187 |
| D213,490 | S | | 3/1969 | Hoover |
| D234,275 | S | * | 2/1975 | Kosecoff ................ D1/129 |
| 4,098,909 | A | | 7/1978 | Mims |
| 4,114,524 | A | | 9/1978 | Welch |
| 4,194,443 | A | | 3/1980 | Mims |
| 4,329,920 | A | | 5/1982 | Rose et al. |
| 4,469,021 | A | | 9/1984 | Rose et al. |
| D277,804 | S | | 3/1985 | Chisholm |
| 4,513,656 | A | | 4/1985 | Fay |
| 4,622,862 | A | * | 11/1986 | Lavely ................ 74/588 |
| 4,622,891 | A | | 11/1986 | Cramer et al. |
| 4,661,366 | A | | 4/1987 | Pinto et al. |
| 4,812,323 | A | | 3/1989 | Savage |
| D309,366 | S | | 7/1990 | Concepcion et al. |
| D312,914 | S | | 12/1990 | Daldrup |
| D315,241 | S | | 3/1991 | Constance |
| 5,064,584 | A | | 11/1991 | Jefferies |
| 5,091,198 | A | | 2/1992 | Hoashi |
| 5,297,947 | A | | 3/1994 | Cardinali |
| 5,573,793 | A | | 11/1996 | Saintain |
| 5,630,496 | A | | 5/1997 | Mims |
| D387,537 | S | | 12/1997 | Fosher |
| 5,865,106 | A | | 2/1999 | van der Ent |
| 6,048,556 | A | * | 4/2000 | Sanguinetti et al. ........... 426/94 |
| 6,074,333 | A | | 6/2000 | Rajala et al. |
| 6,193,105 | B1 | | 2/2001 | Ream et al. |
| 6,267,998 | B1 | * | 7/2001 | Bauman et al. ............ 426/94 |
| D448,812 | S | | 10/2001 | Vong et al. |
| 6,349,815 | B1 | | 2/2002 | Shaffer |
| D469,239 | S | | 1/2003 | Hodgdon |
| 6,759,079 | B2 | | 7/2004 | Klug et al. |
| 7,150,221 | B2 | * | 12/2006 | Morgan ................ 99/428 |
| 2001/0024670 | A1 | | 9/2001 | Gehan et al. |

OTHER PUBLICATIONS

D1 Box AA6: Food and Wine, Mar. 1985, p. 52.
Practical Baking: Fifth Edition, by William J. Sultan, Van Nostrand Reinhold, NY, © 1990, p. 444.
U.S. Appl. No. 29/212,413, filed Sep. 1, 2004, Mihalos et al.
Invenys™ APV® Baker High Speed Creamers, *The APV Baker High Speed Creamer For Continuous And Efficient Oepration*, APV Baker, Grand Rapids, MI , no date.
Invenys™ APV® Baker Pile Pack Creamer, *The Creamer That stacks as it creams as it feeds*, APV Baker, Grand Rapids, MI , no date.
Package wrapper of "Reese's® White Chocolate Peanut Butter cups Limited Edition" Miniatures, H.B. Reese Candy Co., Hershey, PA, no date.

* cited by examiner

*Primary Examiner*—Leslie Wong
(74) *Attorney, Agent, or Firm*—Greenblum & Bernstein, P.L.C.

(57) ABSTRACT

A cookie cup sandwich cookie having dissimilarly-sized base cakes is continuously produced by applying a layer of filler cream to a lower base cake and applying an upper base cake to the lower base cake so that the outer periphery of the upper base cake surrounds the layer of filler cream. The apparatus for the production of the sandwich cookies includes at least one rotary molder for producing lower base cakes and upper base cakes having different sizes, a filler cream depositor that deposits a layer of filler cream on each of the lower base cakes, and a conveyer system for transporting and at least substantially concentrically aligning the dissimilarly sized lower and upper base cakes.

30 Claims, 5 Drawing Sheets

APPARATUS AND METHOD FOR PRODUCING SANDWICH COOKIE HAVING DISSIMILARLY-SIZED BASE CAKES

FIELD OF THE INVENTION

The present invention relates to an apparatus and method for making a sandwich cookie comprising two base cakes having a dissimilar geometry and a filler cream between the two base cakes. The present invention also relates to filled cookie cup sandwich cookies.

BACKGROUND OF THE INVENTION

Sandwich cookies are made from two equally-sized cookie halves and a cream filler. For example, U.S. Pat. No. 4,114,524 to Welch discloses a machine for automatically making sandwiches having filler material located between two cookie halves. The machine comprises a dividing mechanism for receiving rows of cookie halves and for directing alternate rows of cookie halves to a top conveyor and a bottom conveyor. A filler applicator is located above the bottom conveyor for applying filling to the rows of cookie halves on the bottom conveyor. The top conveyor transports rows of cookie halves and deposits them at a sandwich location downstream from the filler applicator.

U.S. Pat. Nos. 4,098,909 and 4,194,443, both to Mims, disclose a method and apparatus for depositing filling on cookie halves having a flat side up. A vacuum pick-up device raises rows of cookie halves having a flat side down and deposits them on the filled cookie halves.

U.S. Pat. No. 2,993,453 to Fay discloses a sandwiching machine for assembling sandwiches that comprise two cookies with a cream filler between them. A conveyor feeds cookies to a cream depositor which deposits a layer of cream on the cookies. Then, another cookie is deposited on the layer of cream and the assembled sandwiches are delivered to a stacker. The cookies are supported by a taut wire arrangement. Pin-like fingers of a conveyor chain slide the cookies along the supporting wires. The cream depositor comprises a tubular shaft having a pair of stencil ports around which a depositor drum rotates. The disclosure of U.S. Pat. No. 2,993,453 to Fay is incorporated herein by reference in its entirety.

U.S. Pat. No. 4,329,920 to Rose et al. discloses an automatic sandwiching machine for cookies. A cookie is deposited from a magazine onto taut parallel wires and conveyed along the wires by pins extending upwardly carried by links of endless chains of a conveyor. A turn-over wheel transfers the cookie from the magazine design-side down onto the parallel wires and then a cream valve or stencil applies cream to the plain side of the cookie. Another cookie is then applied to the cream with the design-side up. The disclosure of U.S. Pat. No. 4,329,920 to Rose et al. is incorporated herein by reference in its entirety.

U.S. Pat. No. 4,469,021 to Rose et al. discloses a sandwiching machine for applying cream, for example, a chocolate or vanilla flavored filling, jelly, peanut butter or the like, to at least two laterally spaced rows of cookies traveling along the sandwiching machine. The sandwiching machine includes a stencil means for applying cream to the cookies in a uniform manner. The stencil assembly comprises a stencil sleeve and a stencil rotatable thereon. The stencil has spaced apart discharge orifices. The stencil sleeve has inlets at each side of the discharge orifices and valve means for controlling the flow of cream through the discharge orifices. A cream hopper communicates with the stencil sleeve inlets. The disclosure of U.S. Pat. No. 4,469,021 to Rose et al. is incorporated herein by reference in its entirety.

Cookie halves may be made by a rotary die molding machine. U.S. Pat. No. 5,297,947 to Cardinali discloses a rotary die molding machine for making cookies, biscuits, and other baked goods. The machine includes a bore or molding cavity in a rotary die roll and a plastic wafer or insert snapped into the cavity. The plastic insert has a design on its face for imprinting a design onto the bakery dough.

Rotary molding, which is a preferred dough processing system due to its high speed capabilities, does not accommodate processing a deep-walled cookie or cookie cup. Deep-walled cookie pieces do not tend to readily release from the rotary mold as a result of adhesion of the dough to the large mold cavity. In addition, known sandwiching processes and machines do not accommodate the assembling of rotary-molded cookie pieces having a dissimilar geometry.

The present invention provides for the continuous, mass production of deep-walled cookie pieces or cookie cups containing a filler by processing of two, rotary molded cookie pieces having a dissimilar geometry. After baking, the two dissimilarly-sized molded pieces can be assembled using a modified sandwiching machine to form a cream-filled sandwich cookie having a cup-like shape.

SUMMARY OF THE INVENTION

The present invention provides a method for continuously producing a sandwich cookie having dissimilarly-sized base cakes and for producing filled deep-walled cookies or cookie cups. In embodiments of the invention an upper base cake surrounds and hides from view, the side edge of a layer of filler cream. The filler cream layer may be visible through the top of the top base cake in some embodiments and not visible through the top in other embodiments. A layer of filler cream may be applied to a lower base cake, then an upper base cake may be applied to the lower base cake so that the outer periphery of the upper base cake surrounds the layer of filler cream. In preferred embodiments, the diameter of the upper base cake is larger than the diameter of the lower base cake to provide a cup shape configuration or profile.

The apparatus for the production of the sandwich cookies includes at least one rotary molder for producing lower base cakes and upper base cakes and a filler cream depositor that deposits a layer of filler cream on each of the lower base cakes. A conveyer system transports and aligns the upper and lower base cakes. The conveyer system comprises a plurality of parallel wires and a plurality of pin assemblies that are moveable along the wires. The pin assemblies push and align the lower and the upper base cakes along the parallel wires.

Each pin assembly contains a pin and a pin jacket that preferably snaps onto each pin. In embodiments of the invention, the pin jacket has a top portion and a bottom portion, where the top portion has a diameter smaller than the diameter of the bottom portion to guide and align a top base cake having a larger diameter than a bottom base cake. The structure of the pin jacket allows for the at least substantially concentric alignment of the dissimilarly-sized lower base cake and upper base cake.

DETAILED DESCRIPTION OF THE INVENTION

Figure 1:
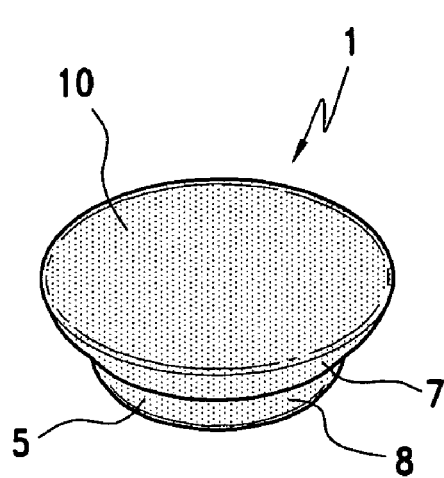
FIG. 1 is a top perspective view of a sandwich cookie according to a first embodiment of the present invention.
Figure 2:
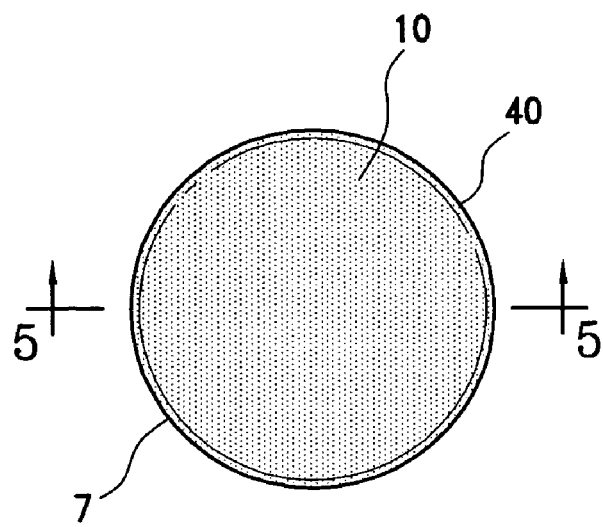
FIG. 2 is a top view of the sandwich cookie of FIG. 1.
Figure 3:
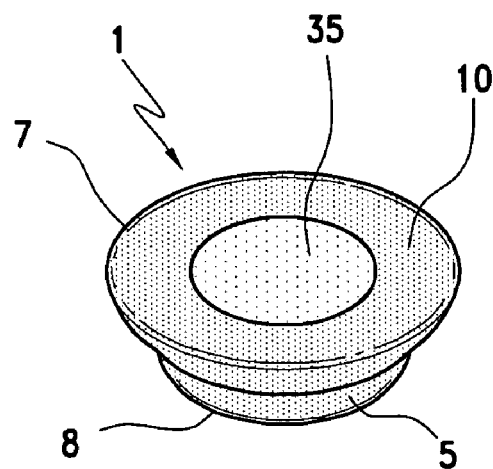
FIG. 3 is a top perspective view of a sandwich cookie according to a second embodiment of the present invention.
Figure 4:
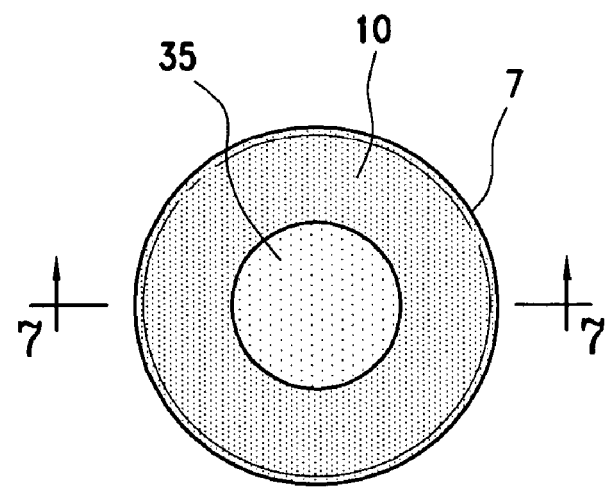
FIG. 4 is a top view of the sandwich cookie of FIG. 3.

Sandwich cookies having dissimilarly sized base cakes may be continuously produced with deep side walls surrounding a filler cream to provide a cookie-cup shape. Rotary molding may be employed to produce upper and lower base cakes which are transported and aligned with each other and a layer of filler cream. Preferably, the upper base cake has a larger diameter than the diameter of the lower base cake to provide a tapered cup shape. An outer edge or periphery of the larger, upper base cake extends beyond an outer edge or periphery of the smaller, lower base cake and surrounds the layer of filler cream. The base cakes and the filler cream may be aligned at least substantially concentrically and transported in the concentric configuration in accordance with the present invention even though the upper base cake has a substantially larger diameter than the diameter of the lower base cake.

Two embodiments of a cup-shaped sandwich cookie in accordance with the present invention are shown in FIGS. 1-8. FIGS. 1, 2, 5, and 6 show a first embodiment where the filler cream is not visible through the top of the top base cake. FIGS. 3, 4, 7, and 8 show a second embodiment where the filler cream is visible through the top of the top base cake. As shown in FIGS. 1-8, both embodiments of a sandwich cookie 1 according to the present invention comprises a lower, small base cake 5 and an upper, larger base cake 10. The lower, small base cake may have at least substantially flat top and bottom surfaces, 11, 12, respectively. The top surface 12 may be larger than the bottom surface 11 of the lower base cake 5. A layer of filler cream 15 is applied to the lower base cake, as shown in FIGS. 5, 6, 7, and 8.

In embodiments, the filler cream 15 may be, for example, a chocolate or vanilla flavored filling (e.g., OREO® icing), a fruit filling, jam, jelly, peanut butter, a cheese flavored filling, and the like. The filler cream layer 15 may have an at least substantially flat top surface 16 which is smaller than an at least substantially flat bottom surface 17 of the filler cream layer 15 as a result of conforming to the upwardly tapered inner walls 28 of the top base cake 10. The larger, upper base cake 10 is then applied to the smaller, lower base cake 5 so that the outer edge or periphery 7 of the upper base cake 10 surrounds the layer of filler cream 15 on the lower base cake 5 and extends beyond an outer edge or periphery 8 of the lower base cake 5.

Figure 5:
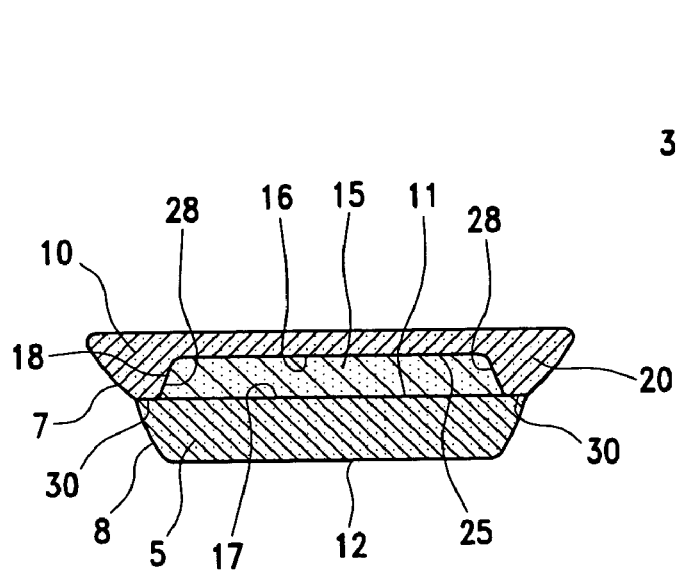
FIG. 5 is a cross-sectional view of the sandwich cookie of FIG. 2.
Figure 6:
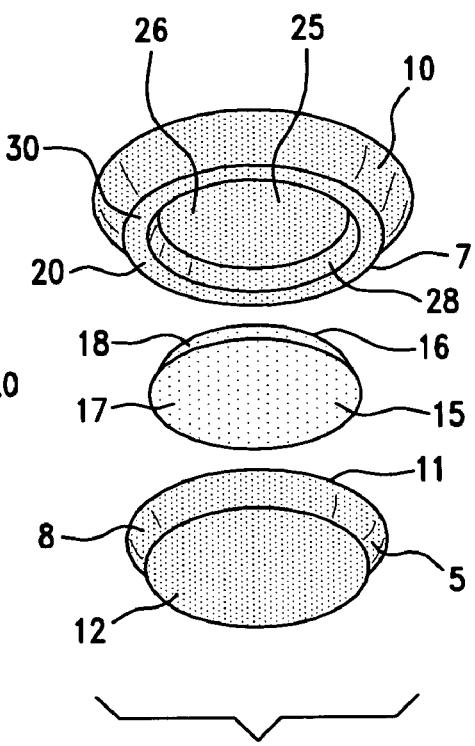
FIG. 6 is an exploded view of the sandwich cookie of FIG. 1 showing a lower base cake, filler cream, and an upper base cake according to a first embodiment of the present invention.

In the first embodiment, the upper base cake 10 may have an annular shoulder 20 and a central recessed area or indentation 25 for receiving the filler cream layer 15, as shown in FIG. 5 and FIG. 6. The filler cream layer 15 may conform to the shape of the cavity 26 formed by the central recessed area 25 and annular shoulder 20 when the upper base cake 10 is placed or pressed onto the lower base cake 5. As shown in FIG. 5, the inner wall 28 of the annular shoulder 20 at least substantially completely surrounds the outer periphery or outer edge 18 of the filler cream layer 15 so that outer edge 18 is essentially not visible from all sides of the sandwich cookie. A very thin portion of the filler cream layer 15 may be present between the bottom-most surface 30 of the upper base cake 10 or bottom wall 30 of the annular shoulder 20 and the top surface 11 of the bottom base cake 5 to help glue or adhere the bottom base cake 5 and top base cake 10 together.

Figure 7:
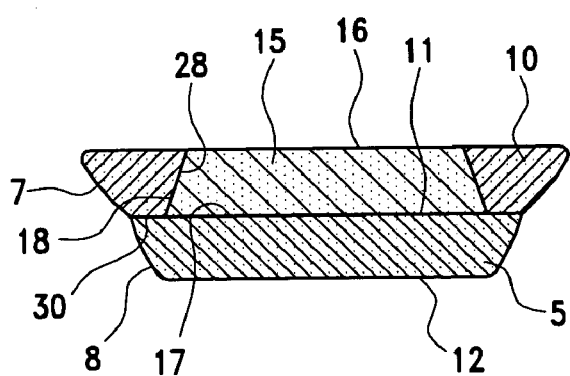
FIG. 7 is a cross-sectional view of the sandwich cookie of FIG. 4.
Figure 8:
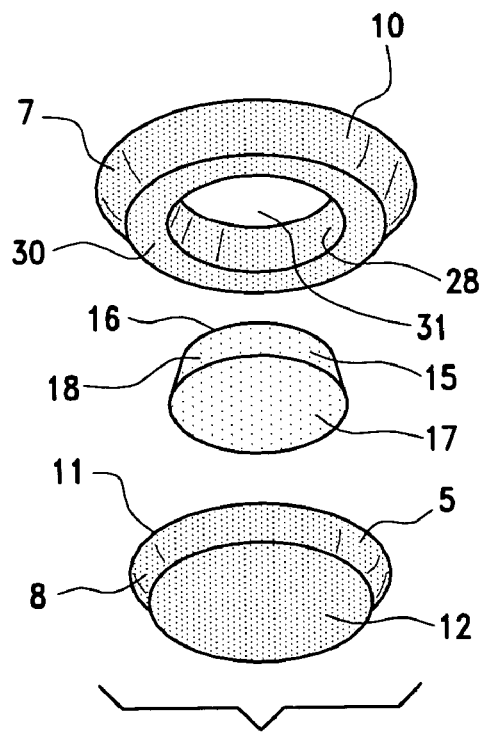
FIG. 8 is an exploded view of the sandwich cookie of FIG. 3 showing a lower base cake, filler cream, and an upper base cake according to a second embodiment of the present invention.

As shown in FIGS. 3, 4, 7, and 8, a second embodiment of a sandwich cookie may comprise a lower base cake 5 with substantially flat top and bottom surfaces 11, 12 and a ring-shaped upper base cake 10. A layer of filler cream 15 may be applied to the lower base cake 5, as shown in FIG. 7 and FIG. 8 in known manner using conventional sandwiching apparatus. In both the first and second embodiments, the bottom-most surface 30 of the upper base cake 10 is preferably ring-shaped or annularly shaped as shown in FIGS. 6 and 8. In the second embodiment, the upper base cake 10 has a central opening or hole 31 for receiving the filler cream layer 15, as shown in FIG. 7 and FIG. 8 when the upper base cake 10 is set in place on the bottom base cake 5. The filler cream layer 15 may conform to the shape of the hole 31 when the upper base cake 10 is placed or pressed onto the lower base cake 5. As shown in FIG. 7, the inner wall 28 of the upper base cake 10 at least substantially completely surrounds the outer periphery or outer edge 18 of the filler cream layer 15 so that outer edge 18 is essentially not visible from the sides of the sandwich cookie. In the second embodiment, shown in FIGS. 3, 4, 7, and 8, a very thin portion of the filler cream layer 15 may be present between the bottom-most surface 30 of the upper base cake 10 and the top surface 11 of the bottom base cake 5 to help glue or adhere the bottom base cake 5 and top base cake 10 together.

In the second embodiment, the entire upper base cake 10 is in the form of a ring, so that once the upper base cake 10 is applied to the lower base cake 5, at least a portion of the top surface 16 of the filler cream layer 15 may be visible through the upper base cake 10, as shown in FIG. 3, FIG. 4, FIG. 7 and FIG. 8. If the filler cream 15 does not completely fill the hole 31 in the ring-shaped upper base cake 10, a coating (not shown), may be applied to the top 16 of the filler cream 15 through the opening 31 in the upper base cake 10. In embodiments of the invention, the coating may be applied to all surfaces of the sandwich cookie to completely enrobe the sandwich cookie within the coating. The coating may be a chocolate coating or a compound coating, such as a vanilla, peanut butter, mint, or fruit flavored compound coating.

The lower and upper base cakes may each have a variety of geometrical shapes and sizes. In embodiments, the lower base cake 5 may have a circular, rectangular, square, triangular, elliptical, hexagonal, or trapezoidal shape or may have an inverted frustoconical shape. The larger upper base cake 10 may be ring-shaped; may have a circular, rectangular, square, triangular, elliptical, hexagonal or trapezoidal shape; or may have an inverted frustoconical shape. The shapes of the upper base cake 10 and the lower base cake 5 may be the same or different, but are preferably the same. In preferred embodiments, the lower base cake 5 and the upper base cake 10 may each have a generally circular outer edge 8, 7, respectively as shown in FIGS. 1-8. According to the present invention, the upper and the lower base cakes are at least substantially concentrically aligned. In preferred embodiments, a lower base cake 5 and a larger upper base cake 10 both have an inverted frustoconical shape, resulting in a sandwich cookie that is cup-shaped, as shown in FIGS. 1-8.

According to a method for making the sandwich cookie, the lower and upper base cakes may be rotary-molded from a dough to obtain rotary molded dough pieces. Differently shaped upper and lower base cakes may be produced on the same rotary molder or on different rotary molders. The dough pieces may be baked in an oven and then laminated with the filler cream in accordance with the present invention to obtain a cookie-cup sandwich cookie.

In the lamination process, a layer of filler cream 15 may be deposited onto the lower base cake 5 in known manner using conventional sandwiching apparatus which may be modified to accommodate the transportation and alignment of different sized base cakes in accordance with the present invention. The bottom surface 17 of the layer of filler cream 15 may completely contact the top surface 11 of the bottom base cake 5. The larger upper base cake 10 may then be applied onto the laminated lower base cake 5 with the modified sandwiching apparatus so that the upper base cake 10 surrounds the outer edge 18 of the layer of filler cream 15, as shown in FIG. 5 and FIG. 7. After the upper base cake 10 is applied to the laminated lower base cake 5, the outer edge 18 of the filler cream layer 15 is not visible. The top surface 16 of the layer of filler cream 15 may completely contact the bottom surface of the upper base cake 10 in embodiments as shown in FIG. 5. The top surface 16 of the filler cream 15 may not contact the bottom surface of the upper base cake 10 in embodiments having rings shaped upper base cakes 10 as shown in FIG. 7. In preferred embodiments, a peripheral portion of the filler cream layer 15 may be compressed between the bottom surface 30 of the upper base cake 10 and the upper surface 11 of the lower base cake 5 without exposing the outer edge 18 of the filler cream layer 15 to help glue or adhere the top base cake 10 to the lower base cake 5.

Figure 9:
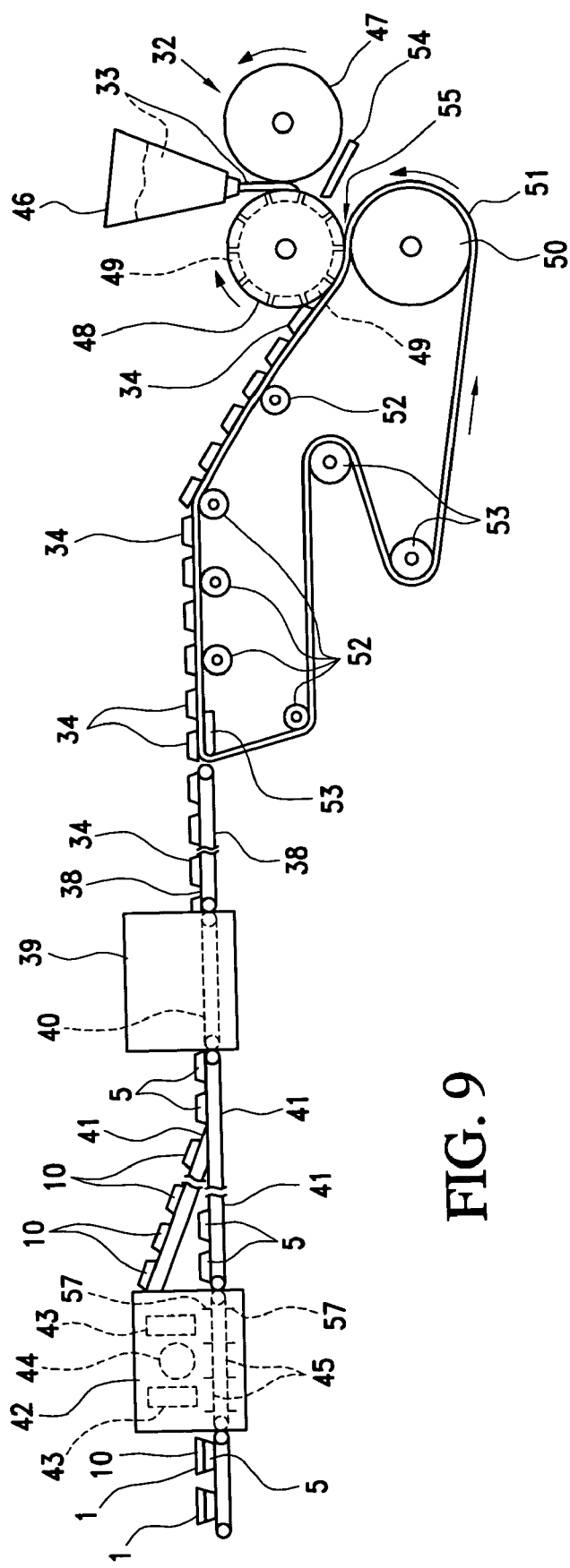
FIG. 9 is a schematic of apparatus for producing sandwich cookies according to the present invention.

According to the present invention, as schematically shown in FIG. 9, an apparatus for the production of sandwich cookies 1 having different-sized base cakes may include at least one rotary molder 32 for rotary molding a dough 33 into dough pieces 34. The dough pieces 34 may be transported using belts and transferring equipment 38 to a continuous zone oven 39 having an oven band 40. The dough pieces 34 may be baked in oven 39 into lower base cakes 5 and upper base cakes 10 which may have a larger diameter than the lower base cakes 5. The lower base cakes 5 and upper base cakes 10 may be transported by one or more conveyer belts 41 to a cookie sandwiching machine 42 having base cake magazines 43. The sandwiching machine 42 may include a conventional filler cream depositor 44 which deposits a layer of filler cream 15 on each of the lower base cakes 5. The sandwiching machine 42 may further include a conveyer system 45 for transporting and at least substantially concentrically aligning the lower base cakes 5 and the upper base cakes 10.

Commercially available rotary molders may be used in the apparatus of the present invention, such as those produced by Weidenmuller Co., Morton Grove, Ill. Exemplary of rotary die molding machines which may be employed in the present invention are disclosed in U.S. Pat. No. 5,064,504 to Jefferies and U.S. Pat. No. 5,297,947 to Cardinali, the disclosures of which are herein incorporated by reference in their entireties.

In embodiments of the invention, the rotary molder 32 may include a feed hopper 46 for feeding of a dough mass 33 to a rotating feed drum or roll 47. The rotating feeding drum 47 can be corrugated or provided with a plurality of peripheral transverse ribs (not shown) for feeding purposes. The rotating feed drum 47 may be mounted on bearings supported on a frame (not shown). Positioned adjacent to and in peripheral contact with the rotating feeding drum 47 may be a rotary molding drum or die roll 48. The rotary molding drum 48 may be provided with a plurality of molding cavities or dies 49 positioned in a particular arrangement about the peripheral surface of the rotary molding drum 48. The rotary molding drum 48 may be rotatably mounted on bearings supported by the frame (not shown). Positioned beneath the rotary molding drum 48 is a pressing drum or forming roll 50. The pressing drum or forming roll 50 is mounted on bearings supported on the frame (not shown).

A continuous web conveyor 51 may be supported on a plurality of guide rollers 52 and fed between the rotary molding drum 48 and the pressing drum 50. The continuous web conveyor 51 may be made of a fabric-type composite material with which the individual dough pieces 34 being formed preferentially adhere verses the inner surfaces of the molding cavities 49 in order to remove the individual pieces therefrom. The individual dough pieces 34 effectively adhere to the continuous web conveyor 51 to maintain substantially the same pattern or alignment of the individual pieces 34 as they had in the cavities 49 of the rotary molder die roll 48. The drums 47, 48, and 50 of the rotary molding apparatus 32 and the continuous web conveyor 51 may be driven by conventional drives (not shown).

As shown in FIG. 9, rotary molding apparatus 32 may include a tensioning device comprising tensioning rollers 53. Further, the continuous web conveyor 51 may be fed over a blade or noser 53 for discharging the individual dough pieces 34 onto another conveyor 38 leading, for example, to a baking oven 39.

As shown in FIG. 9, the dough 33 is fed into the molding cavities 49 of the rotary molding drum 48 by the rotating feeding drum 47. A wiper or scraper blade 54, may be used to remove any excess dough material extending above the molding cavities 49. The individual dough pieces formed in the molding cavities 49 are transferred into and through the nip 55 between the rotary molding drum 48 and pressing drum 50 to enable transferring and adhesion of the dough pieces 34 to the continuous web conveyor 51.

The individual dough pieces 34 may be transferred from the rotary molding apparatus 32 to the oven 39 in the particular arrangement dictated by the spatial arrangement of the molding cavities 49 on the peripheral surface of the rotary molding drum 48.

In embodiments of the invention, the at least one rotary molder 32 may be used to produce both the lower base cakes 5 and the larger upper base cakes 10. For example, one half of each rotary molder may include rotary molder die cups for producing the lower base cakes 5 and the other half of each rotary molder may include die cups for producing the upper base cakes 10. The lower base cakes 5 and the upper base cakes 10 may be transported to separate magazines of the sandwiching machine 42 in conventional manner. In other embodiments, the apparatus may contain a plurality of rotary molders arranged in series and/or parallel for producing lower base cakes 5 and upper base cakes 10. For example, the upper base cakes 10 may be produced by one or more serially or parallel arranged rotary molders and the lower base cakes 5 may be produced by one or more different serially or parallel arranged rotary molders. After a dough is rotary-molded to form the lower and upper base cakes 5, 10, the lower and upper base cakes 5, 10 may be transported using conventional conveyor belts and base cake transferring equipment 38 to the oven belt 40 of oven 39 for baking and then sandwiching with cookie sandwiching machine 42

The sandwiching machine 42 may be a conventional sandwiching machine which is modified in accordance with the present invention with a pin insert, pin sleeve or pin jacket to accommodate and at least substantially concentrically align differently sized upper and lower base cakes. Conventional sandwiching machines equipped with a conveyor system for modification in accordance with the present invention include cookie sandwiching machines made by APV Baker, Peterborough, UK (e.g., an APV High Speed Creamer or Pile Pack Creamer sandwiching machine), and Peters Machinery Company, Chicago, Ill. Sandwiching machines which may be modified in accordance with the present invention are disclosed in U.S. Pat. No. 2,993,453 to Fay, and U.S. Pat. No. 4,329,920 to Rose et al, the disclosures of which are herein incorporated by reference in their entireties.

The sandwiching machine may be mounted on a main frame with upstream and downstream magazines that are longitudinally aligned and feed a conveyer system equipped with base cake conveying pins and cake supporting wires. The lower base cakes may be removed one-by-one from an upstream magazine by a plurality of pins that are moveable along a plurality of supporting wires. Generally, the pins are arranged in pairs in a plane which is generally perpendicular to two generally parallel support wires. Each pair of pins pushes each lower base cake which is supported on the tops of the wires to a cream depositor for deposition of the filler cream upon the lower base cake. After deposition of the filler cream, the lower base cakes with the deposits of filler cream are transported by the pins along the plurality of parallel wires to a downstream magazine from which the upper base cake is deposited to form a sandwich cookie.

The cream depositor may be any conventional depositor that applies a filler cream to a lower base cake. In embodiments, the cream depositor may comprise a tubular shaft having a one or more stencil ports around which a depositor drum rotates. The filler cream is fed to the tubular shaft and flows through the one or more stencil ports onto the lower base cakes. As the depositor drum rotates, a cutoff wire cuts off the filler cream for each stencil, thereby leaving a defined deposit of filler cream on the lower base cake. The cream depositor of U.S. Pat. No. 2,993,453 to Fay is incorporated herein by reference in its entirety. Further, the stencil assembly and cream hopper of U.S. Pat. No. 4,469,021 to Rose et al. are also incorporated herein by reference in its entirety.

The conveyor system, including the supporting wires and pin-like fingers and magazines, and the cream depositor, cutoff wire, stencil, chains, and rails of U.S. Pat. No. 2,993,453 to Fay are incorporated herein by reference in its entirety. Similarly, the apparatus of U.S. Pat. No. 4,329,920 to Rose et al., including the parallel wires, pins, endless conveyor chains, motors, drives, and cream-applying valve or stencil, is incorporated herein by reference in its entirety.

In conventional sandwiching machines, the pins or fingers are generally cylindrically shaped and align the trailing edges of the top and bottom base cakes in the same vertical plane. For base cakes which are the same size, the leading edges of the base cakes would also be aligned in one vertical plane and the bottom and top base cakes would be aligned concentrically with each other. However, if such conventional straight pins are employed with dissimilarly sized bottom and top base cakes, the trailing edges of the base cakes would be aligned in the same vertical plane but the leading edges would be in different vertical planes resulting in off-centered top base cakes.

In accordance with the present invention, pin assemblies are provided which align the trailing edges of differently sized top and bottom base cakes in different vertical planes so that the top and bottom base cakes are at least substantially concentrically aligned with each other in the sandwich cookie. The conventional straight or cylindrical pins of conventional sandwiching apparatus may be retrofit with a pin insert, sleeve or jacket to obtain a pin assembly in accordance with the present invention. In other embodiments, the conventional cylindrical or straight pins may be replaced with an integral piece or assembly which provides the same profile or shape which is provided by the pin and pin jacket arrangement.

Also, in conventional sandwich cookie production, the top base cake is deposited upon the layer of filler cream and does not contact the lower base cake. However, in the production of a cookie-cup sandwich cookie in accordance with the present invention, the upper base cake contacts the lower base cake as well as the layer of filler cream. The pin assemblies of the present invention provide for precise placement and centering of the top base cake for proper contact with both the lower base cake and the filler cream. The placement and alignment result in at least substantial concentricity and at least substantially parallel orientations with respect to the lower and upper base cakes of the sandwich cookie.

Figure 10:
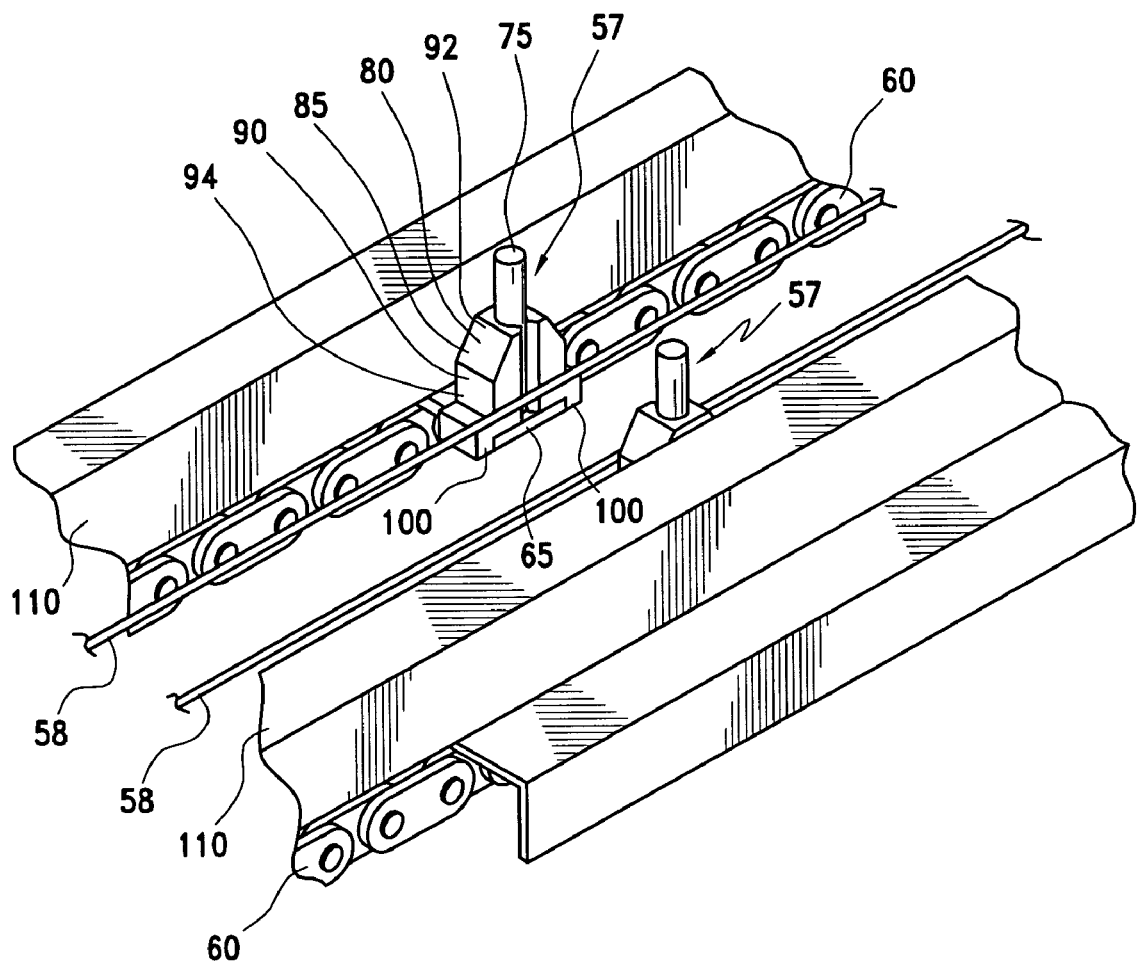
FIG. 10 is a partial top perspective view of sandwiching apparatus for producing sandwich cookies according to the present invention.
Figure 11:
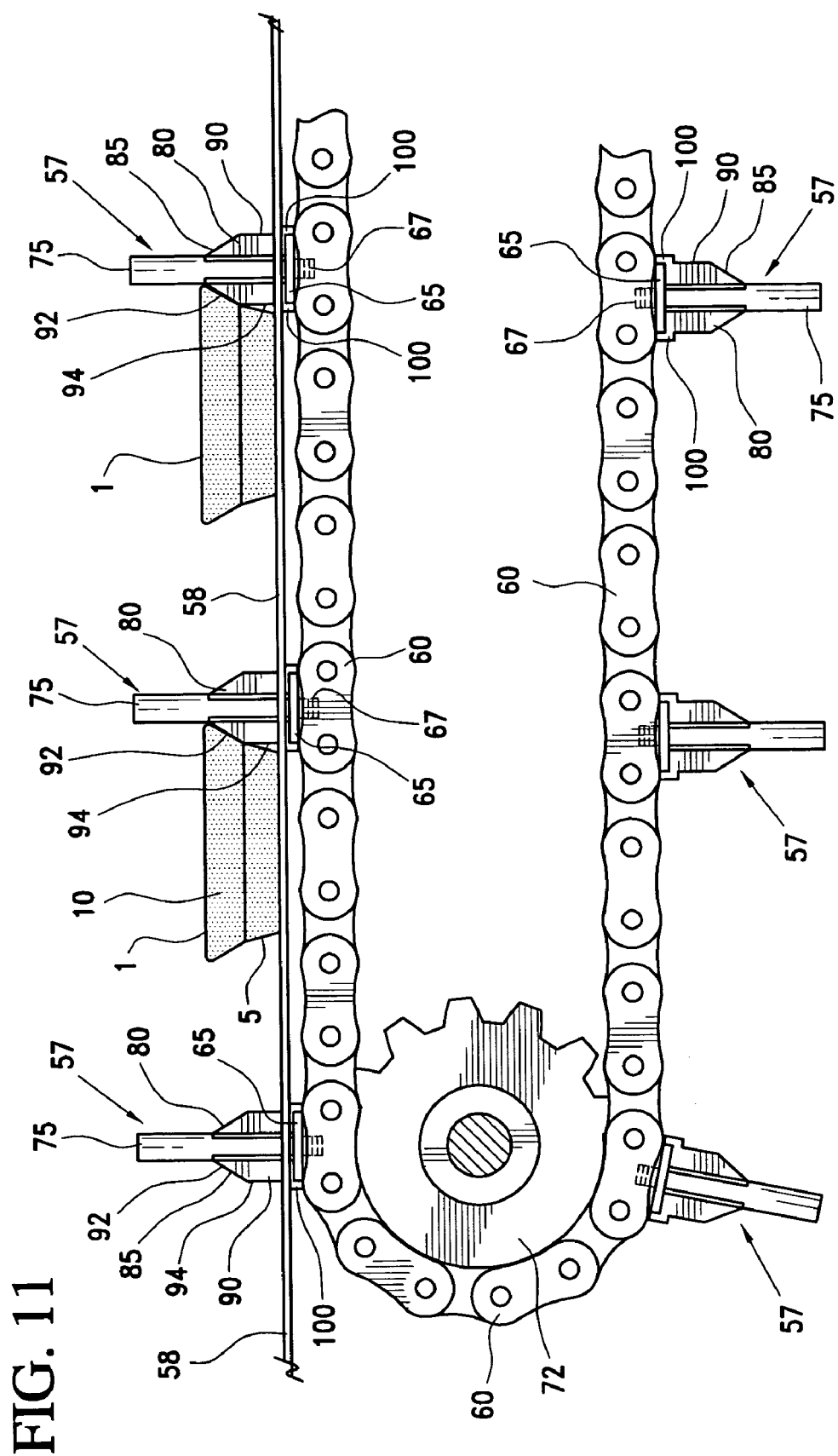
FIG. 11 is a partial side view of an apparatus of the present invention showing transportation and alignment of sandwich cookies having dissimilarly-sized base cakes.

A sandwich cookie conveyer system 45 having pin assemblies 57 for transporting and concentrically aligning bottom base cakes S and top base cakes 10 in accordance with the present invention is illustrated in FIGS. 9-13. The plurality of parallel base cake supporting wires 58 extend between opposing pairs of pin assemblies 57 as shown in FIGS. 10 and 11. The pin assemblies 57 may each be attached to links of endless chains 60 of the modified conveyor system 45 via a connector or side plate 65. The connector or side plate 65 may be screwed into, riveted to, or otherwise attached or fastened via a fastener 67 to the top or side wall of the chain 60 in conventional manner as shown in FIGS. 10 and 11. Each pin assembly 57 may be fastened to the connector or side plate 65 by a screw or bolt or other conventional fastener which extends through or from the side plate 65 into the pin 75 of the pin assembly 57. The endless chains 60 may be driven by a motor, for example, an electric motor (non shown) or the like around sprockets such as end sprocket 72 as shown in FIG. 11.

Each of the pin assemblies 57 comprises a pin 75. The pin 75 is modified by the addition of a pin insert, sleeve or jacket 80, as shown in FIGS. 10-13. The pin jacket 80 preferably snaps onto or is press fit over the pin 75. In other embodiments, the pin jacket 80 may be secured to each pin 75 by a screw or by an adhesive. The pin jacket 80 may be made from any suitable material, for example plastic.

The pin jacket 80 has a top portion 85 and a bottom portion 90, as shown in FIGS. 10-13. In preferred embodiments, the top portion 85 has a diameter or width smaller than the diameter or width of the bottom portion 90. The top portion 85 may be angled and slope from the bottom portion 90 toward the pin 75. In embodiments, the top portion 85 may be at an angle of about 25° to about 45°, preferably about 30° to about 35°, for example about 32°, as measured from a vertical axis extending from the outer side of the bottom portion 90. Thus, the top portion 85 may have a leading edge 92 that trails a leading edge 94 of the bottom portion 90 as shown in FIGS. 10 and 11.

Figures 12, 13:
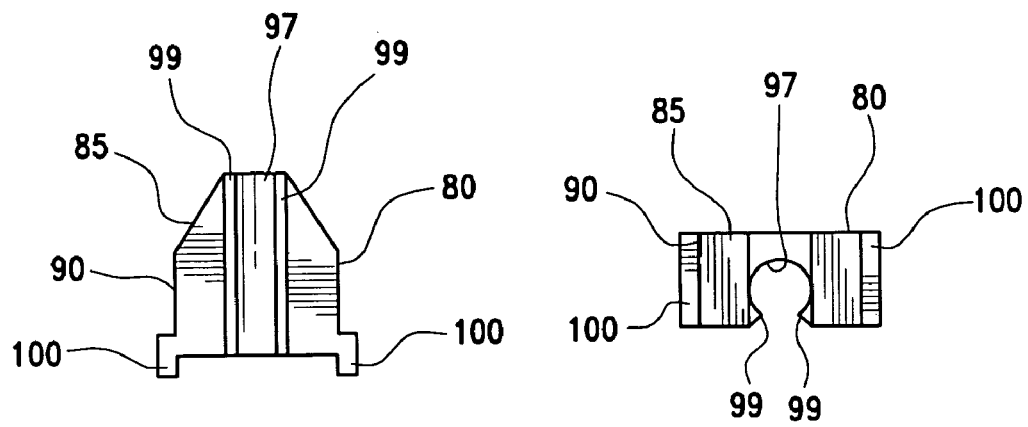
FIG. 12 is a side elevational view of a pin jacket according to the present invention.
FIG. 13 is a top view of the pin jacket of the present invention shown in FIG. 11.

The pin jacket 80 may have a central longitudinal passageway, bore, groove or opening 97 through which the pin 75 passes. Opposing longitudinal projections 99 as shown in FIGS. 12 and 13 may be provided for securing the pin within the opening 97 in a snug or snap-fit arrangement. The bottom of the pin jacket 80 may include downwardly extending ridges 100 which extend over and contact the sides of the side plate 65 as shown in FIGS. 10-13. The ridges 100 help to secure the pin jacket 80 to the side plate and prevent rotational movement of the pin jacket 80 about the pin 75.

Due to the pin jacket 80, the pin assemblies 57 at least substantially concentrically align the differently-sized lower base cakes 5 and upper base cakes 10, as shown in FIG. 11 in the direction of transport of the lower base cake 5. The bottom portion 90 of the pin jacket 80 pushes the lower base cake 5 and the top portion 85 of the pin jacket 80 serves as a placement guide for and pushes the upper base cake 10, thereby at least substantially concentrically aligning both base cakes 5, 10. A portion of the upper base cake 10 may also be in contact with the pin 75 so that the pin 75 assists in pushing and aligning the top base cake 10. The leading edge profile provided by the pin assembly 80 is preferably substantially the same as the trailing edge profile of the sandwich cookie 1 as shown in FIG. 11. In preferred embodiments, the height of the bottom portion 90 of the pin jacket 80 above the top of the supporting wires 58 may be substantially equal to the height of the bottom base cake 5 as shown in FIG. 11. Also, in preferred embodiments, the height of the top portion 85 of the pin jacket 80 may be substantially equal to the height of the top base cake 10 as shown in FIG. 11.

As shown in FIG. 10, the conveyer system 45 may also include side rail guides 110 for aligning the upper base cakes 10 with the lower base cakes 5 in a direction transverse to the direction of transport of the lower base cakes 5. The opposing side rail guides 110 are located outside of the support wires 58 and the pin assemblies 57. The side rails 110 may extend above and along the length of the supporting wires 58 upon which the lower base cakes 5 are transported during and after fabrication of the sandwich cookie 1. The side rails 110 may extend above and along the length of the supporting wires 58 upon which the lower base cakes 5 are transported through the first magazine, through the depositing section, and up to the second magazine, at which point the guides are offset to accommodate the upper base cake 10 for the fabrication of the sandwich cookie 1.

After fabrication of the cookie cup sandwich cookie 1 by the sandwiching machine 42, the sandwich cookies may be transferred to a conveyer for optional application of a coating material. In embodiments of the invention, the sandwich cookie 1 may be enrobed in chocolate or a compound coating or treated with another flavoring and/or coloring agent using conventional coating or enrobing equipment. The sandwich cookies may then be conveyed for counting and packaging in a conventional manner.

What is claimed is:

1. A method for continuously producing a sandwich cookie having dissimilarly-sized base cakes, comprising:
   a. providing a lower base cake,
   b. applying a layer of filler cream to the lower base cake, and
   c. applying an upper base cake to the lower base cake so that an outer periphery of the upper base cake surrounds the layer of filler cream and extends beyond an outer periphery of the lower base cake wherein the lower and upper base cakes are pushed and aligned by a plurality of pin assemblies.
2. A method as claimed in claim 1, wherein said upper base cake is ring-shaped.
3. A method as claimed in claim 1, wherein said lower base cake has an inverted frustoconical shape.
4. A method as claimed in claim 1, wherein said upper base cake comprises an annular shoulder and a central recessed area for receiving said filler cream.
5. A method as claimed in claim 1, wherein said upper base cake has an inverted frustoconical shape.
6. A method as claimed in claim 1, wherein said upper and lower base cakes are at least substantially concentrically aligned.
7. A method as claimed in claim 1, wherein said pin assemblies comprise inserts or jackets having an upper portion and a lower portion, said upper portion having a diameter smaller than the diameter of said lower portion.
8. A method as claimed in claim 1, wherein said pin assemblies align said lower and upper base cakes in the direction of transport of said lower base cake.
9. A method as claimed in claim 8, wherein rails or guides align said upper base cake in a direction transverse to the direction of transport of said lower base cake.
10. A method as claimed in claim 1, wherein said lower base cake is transported on a plurality of wires by the plurality of pin assemblies.
11. A method as claimed in claim 2, wherein a coating is applied to the top of said filler cream through an opening in said upper base cake.
12. A method as claimed in claim 1, wherein said lower base cake and said upper base cake each has an inverted frustoconical shape.
13. A method as claimed in claim 12, wherein said upper base cake is ring-shaped, and said upper and lower base cakes are at least substantially concentrically aligned.
14. A method as claimed in claim 1, wherein said upper base cake and said lower base cake each have a circular outer edge.
15. A method as claimed in claim 1, wherein an outer edge of said filler cream layer is not visible.
16. A method as claimed in claim 15, wherein at least a portion of said filler cream layer is visible through said upper base cake.
17. A method as claimed in claim 1, wherein a portion of said filler cream layer is compressed between said upper base cake and said lower base cake without exposing an outer edge of said filler cream layer.
18. A method as claimed in claim 1, wherein said sandwich cookie is cup-shaped.
19. A method as claimed in claim 1, wherein said filler cream layer is selected from the group consisting of a chocolate or vanilla flavored filling, a fruit filling, jam, jelly, peanut butter, and a cheese flavored filling.
20. A method as claimed in claim 1,
   wherein each of said pin assemblies comprises a pin and a pin jacket, said pin jacket having a top portion and a bottom portion, said top portion having a leading edge which trails a leading edge of the bottom portion so as to at least substantially concentrically align said upper and lower base cakes.
21. A method according to claim 20, wherein the top portion of the pin jacket is angled and slopes from the bottom portion of the pin jacket toward the pin.
22. A method as claimed in claim 20, wherein at least one rotary molder produces both said upper and lower base cakes.
23. A method as claimed in claim 20, wherein said upper and lower base cakes are produced by different rotary molders.
24. A method as claimed in claim 20, wherein said pin assemblies are driven by a chain.

25. A method as claimed in claim 20, wherein said pin assemblies align a lower base cake which has an inverted frustoconical shape with an upper base cake which has an inverted frustoconical shape to obtain a cup shape.

26. A method as claimed in claim 20, wherein said pin assemblies align an upper base cake which is ring shaped.

27. A method as claimed in claim 20, wherein said lower base cake is transported on a plurality of wires by the plurality of pin assemblies.

28. A method as claimed in claim 20, wherein rails or guides align the upper base cake with the lower base cake in a direction transverse to the direction of transport of said lower base cake.

29. A method as claimed in claim 27, wherein said pin assemblies are driven by a chain.

30. A method as claimed in claim 1, wherein said upper and lower base cakes are produced by rotary molding a dough to obtain rotary molded dough pieces, and the dough pieces are baked in an oven to obtain said upper and lower base cakes, and then the upper and lower base cakes are laminated with the filler cream to obtain a sandwich cookie.

* * * * *